United States Patent
Okada et al.

(10) Patent No.: US 7,719,148 B2
(45) Date of Patent: May 18, 2010

(54) MOTOR STATOR STRUCTURE

(75) Inventors: Tomoyuki Okada, Saitama (JP);
Michihisa Kono, Saitama (JP);
Hiroyuki Sato, Saitama (JP); Minoru Nakajima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 307 days.

(21) Appl. No.: 11/773,112

(22) Filed: Jul. 3, 2007

(65) Prior Publication Data

US 2008/0122301 A1 May 29, 2008

(30) Foreign Application Priority Data

Jul. 4, 2006 (JP) ............................. 2006-184847
Jul. 4, 2006 (JP) ............................. 2006-184849

(51) Int. Cl.
*H02K 3/52* (2006.01)
(52) U.S. Cl. ....................................................... 310/71
(58) Field of Classification Search .................... 310/71
See application file for complete search history.

(56) References Cited

U.S. PATENT DOCUMENTS

2004/0070293 A1* 4/2004 Kabasawa et al. ............. 310/71
2004/0251752 A1 12/2004 Shinzaki et al.
2004/0263015 A1 12/2004 Okada et al.
2005/0189828 A1* 9/2005 Nakayama et al. ............ 310/71
2006/0033395 A1 2/2006 Izumi et al.

FOREIGN PATENT DOCUMENTS

DE 102 61 611 A1 7/2004
JP 2007-68369 A 3/2007

OTHER PUBLICATIONS

European Search Report dated Feb. 5, 2008 issued in the corresponding European Patent Application No. 07111616.

* cited by examiner

*Primary Examiner*—Burton Mullins
(74) *Attorney, Agent, or Firm*—Westerman, Hattori, Daniels & Adrian, LLP

(57) ABSTRACT

In a motor stator structure, a neutral-point bus ring is arranged along an inner peripheral portion of a stator, and alternately includes a larger-diameter portion, a first link portion, a smaller-diameter portion, and a second link portion. An end of a wound wire pulled out of a coil is located between radially-extending adjacent first and second link portions. A connecting terminal is connected at one end to the end of the wound wire, and at the other end to the first and second link portions. The use of the neutral-point bus ring ensures that a neutral point can be formed without bending the end of the wound wire of the coil into a U-shape. Particularly when a rectangular cross-section wire difficult to bend is used as the wound wire, the processing cost can be reduced.

4 Claims, 9 Drawing Sheets

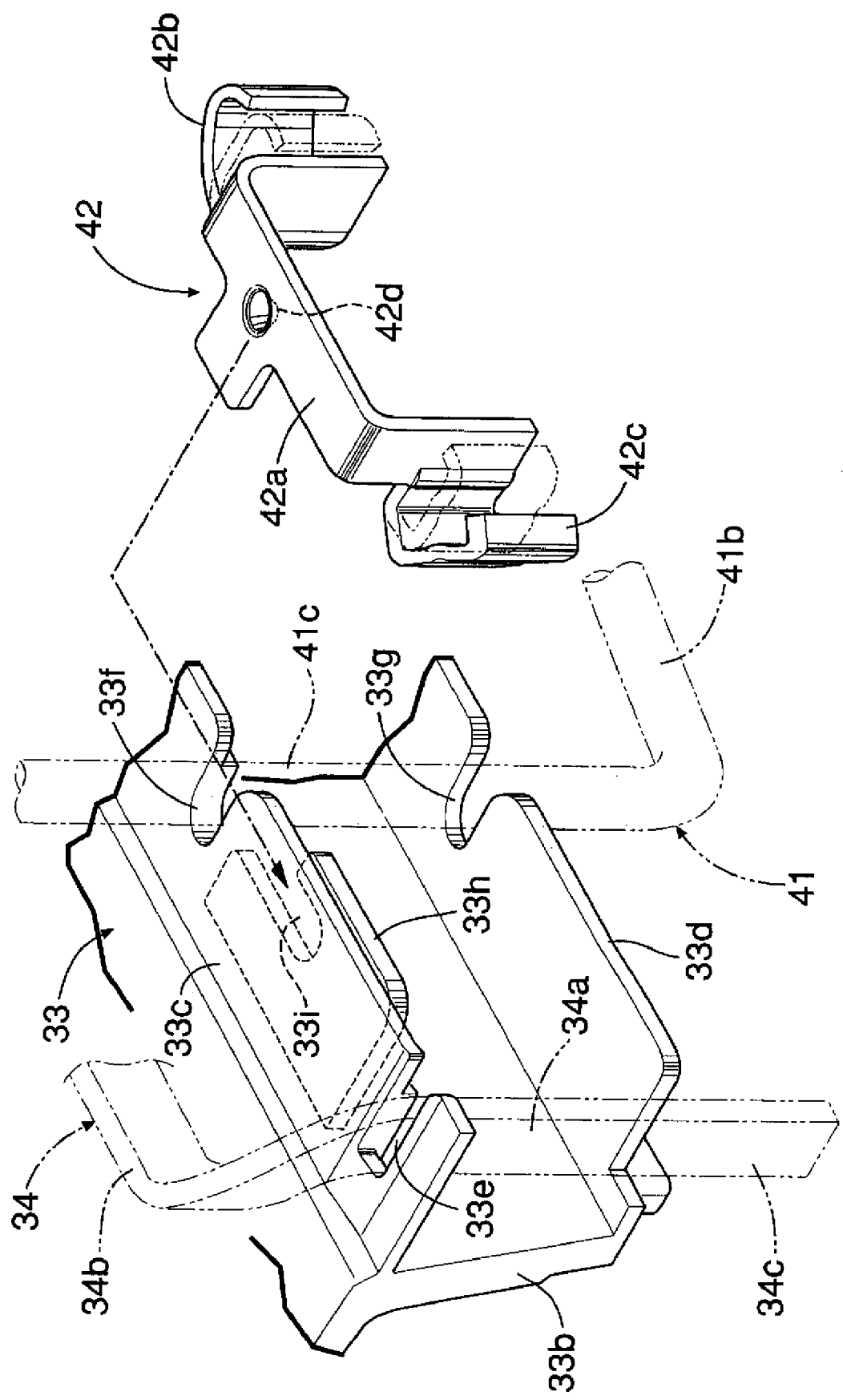

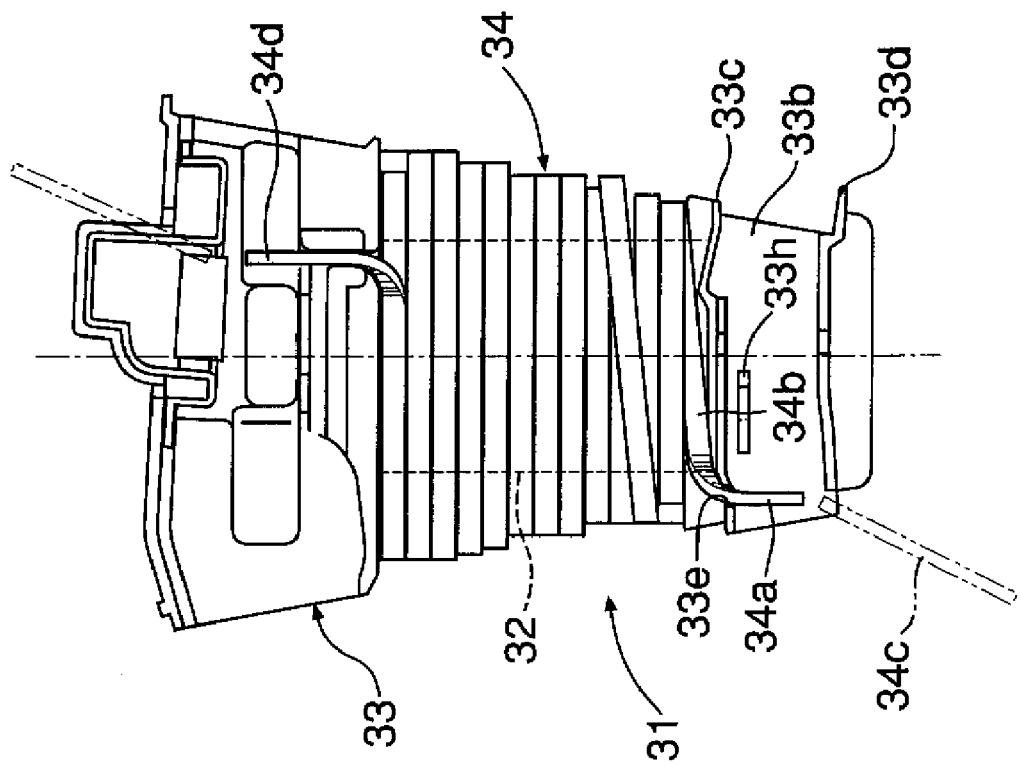
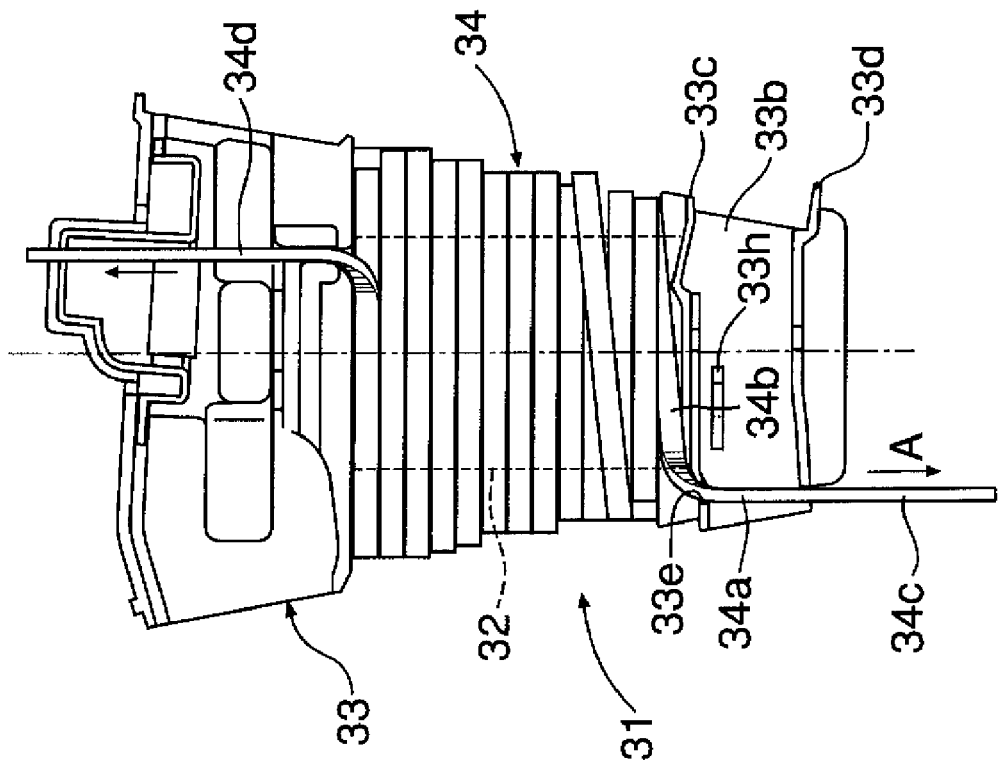

MOTOR STATOR STRUCTURE

RELATED APPLICATION DATA

The present invention is based upon Japanese priority application Nos. 2006-184847 and 2006-184849, which are hereby incorporated in their entirety herein by reference.

TECHNICAL FIELD

The present invention relates to a motor stator structure comprising: a stator which includes a plurality of coils each including a wire wound around a periphery of an iron core, the coils being annularly arranged about an axis of the stator, first ends of the wires of the coils being connected to each other by connecting terminals.

Also, the present invention relates to a motor stator structure comprising: a stator which includes a plurality of coils each including a wire wound around a periphery of an iron core with an insulator provided therebetween, wherein a potting with a synthetic resin is provided on portions where first ends of the wires of the coils are connected to each other by connecting terminals.

BACKGROUND OF THE INVENTION

A general stator of a DC brushless motor comprises pluralities of U-phase coils, V-phase coils and W-phase coils each including a wire wound around an outer periphery of an iron core with an insulator provided therebetween, the coils being sequentially arranged in a circumferential direction. Ends of the wound wires pulled out of radially inner ends of the coil are integrally connected to each other to form grounds (neutral points).

In a wire-connection structure of a motor disclosed by Japanese Patent Application No. 2005-254569 which was filed by the present applicant, an end of a wound wire having a rectangular cross-section and pulled out of each coil is bent into a U-shape, and the U-shape bent portions of the wound wires of the adjacent two coils are connected to each other by fusing the wound wires to opposite ends of a connecting terminal, thereby forming a neutral point. Also, in this Japanese Patent Application, the present applicant proposed a structure in which the end of the wound wire pulled out of each coil is connected by the connecting terminal between an outer partition wall and an inner partition wall of an insulator, thereby forming a neutral point.

In bending a circular cross-sectioned wire, the wire has no directionality bias. On the other hand, a rectangular cross-sectioned wire can be easily bent in two directions perpendicular to each of their surfaces, but it is difficult to bend the rectangular cross-sectioned wire in directions oblique to their surfaces. Therefore, when the rectangular cross-sectioned wire is employed as the wound wire, there is a problem: it is not possible to completely mechanize the operation of bending the end of the wound wire pulled out of the coil into a U-shape, and thus manual operation is required, greatly increasing the processing cost.

Further, a space formed between the outer partition wall and the inner partition wall of the insulator is potted with a synthetic resin in order to prevent the breaking and corrosion of the wound wire and the connecting terminal. In this structure, notches for passing the wound wire therethrough are formed in the outer partition wall and the inner partition wall. However, because the notches are plugged by the wound wire passing therethrough, unhardened synthetic resin charged into a space between the outer partition wall and the inner partition wall hardly leaks out of the notches.

However, the wire pulled out of the coil includes a scrap wire portion for providing a tension to the wire during the wire-winding operation. When the scrap wire portion is passed through the notches in the outer partition wall and the inner partition wall, there is a disadvantage: because the scrap wire portion eventually becomes needless after completion of the wire-winding, the scrap wire portion is cut from a portion between the outer partition wall and the inner partition wall and discarded. The notch formed in the inner partition wall for passing the scrap wire portion therethrough is open without being plugged by the wound wire during the potting. Thus the synthetic resin leaks out of the notch, thereby requiring an operation of wiping off the leaking synthetic resin.

SUMMARY OF THE INVENTION

Accordingly, it is a first object of the present invention to ensure that an end of a wound wire of each coil in a motor stator can be connected to a neutral point without being bent into a U-shape.

It is a second object of the present invention to ensure that when a connected portion of a wound wire of each coil in a motor stator is potted with a synthetic resin, leakage of the synthetic resin is prevented.

In order to achieve the first object, according to a first feature of the present invention, there is provided a motor stator structure comprising: a stator which includes a plurality of coils each including a wire wound around a periphery of an iron core, the coils being annularly arranged about an axis of the stator, first ends of the wires of the coils being connected to each other by connecting terminals, wherein each of the first ends of the wound wire is positioned between adjacent two link portions which radially extend; and wherein first end of each connecting terminals is connected to the one end of the wound wire, and a second end of each said connecting terminals is connected to the link portion.

With the arrangement of the first feature, the neutral-point bus ring arranged along the inner peripheral portion of the stator alternately includes circumferentially-extending larger-diameter portions, radially-extending link portions, circumferentially-extending smaller-diameter portions, and the radially-extending link portions; the end of the wound wire pulled out of each coil is located between adjacent two link portions which extend radially; and the connecting terminal is connected at the first end to the end of the wound wire and at the second end to the link portion. Therefore, it is possible to form a neutral point by connecting the end of the wound wire to the neutral-point bus ring without bending the end of the wound wire into a U-shape, thereby reducing the processing cost of bending the wound wire. Further, the two link portions in the neutral-point bus ring and the end of the wound wire both extend radially, and hence it is easy to connect the link portions of the neutral-point bus ring and the ends of the wound wire to the connecting terminals.

According to a second feature of the present invention, in addition to the first feature, a bent portion connecting one of the adjacent two link portions of the neutral-point bus ring to the larger-diameter portion is located radial outwardly of a pulled-out portion of the wound wire of the coil, so as to provide a space radially inward of the bent portion into which a nozzle for potting the pulled-out portion can be inserted.

With the arrangement of the second feature, the bent portion connecting one of the adjacent two link portions in the neutral-point bus ring to the larger-diameter portion is located radially outward of the pulled-out portion of the wound wire of the coil, and the space for inserting the potting nozzle thereinto is formed radially inward of the bent portion. Therefore, the nozzle can be inserted into the space to pot the pulled-out portion of the wound wire without being obstructed by the neutral-point bus ring.

According to a third feature of the present invention, in addition to the first or second feature, the wound wire of the coil is formed of a rectangular cross-sectioned wire, and the neutral-point bus ring is formed of a circular cross-sectioned wire.

With the arrangement of the third feature, because the wound wire is formed of a rectangular cross-sectioned wire, the lamination factor of the coil can be increased, and further it is not required to bend the rectangular cross-sectioned wire into a U-shape, thereby enhancing the effect of reducing the cost. In addition, the neutral-point bus ring is formed of the circular cross-sectioned wire, and hence it is easy to bend the neutral-point bus ring into a predetermined shape.

In order to achieve the second object, according to a fourth feature of the present invention, there is provided a motor stator structure comprising: a stator which includes a plurality of coils each including a wire wound around a periphery of an iron core with an insulator provided therebetween, the insulator including an outer partition wall and an inner partition wall which are provided on a radially interior portion of the insulator and extend circumferentially, the wound wire pulled out of each of the coils being cut at a portion positioned between the outer partition wall and the inner partition wall, the cut portions being connected to each other via a connecting terminal, and a potting with a synthetic resin being provided in an annular space between the outer partition walls and the inner partition walls so that the potting covers the connecting terminals when the adjacent insulators are brought into contact with each other. A wound-wire notch through which the wound wire is passed is formed only in the outer partition wall among the outer partition wall and the inner partition wall.

With the arrangement of the fourth feature, the wound-wire notch for passing the wound wire therethrough is formed in only the outer partition wall among the circumferentially extending outer and inner partition walls provided on the radially inner portion of the insulator. Therefore, when the annular space between the outer partition wall and the inner partition wall is potted with the synthetic resin after the plurality of coils whose wound wires are cut between the outer partition wall and the inner partition wall are annularly arranged to form the stator and the ends of the wound wires are connected by the connecting terminals, it is possible to prevent the synthetic resin from leaking out of the annular space. This is because the wound-wire notch of the outer partition wall is plugged by the wound wire pulled out of the coil and passes through the wound-wire notch, and the inner partition wall has no wound-wire notch.

According to a fifth feature of the present invention, in addition to the fourth feature, the wound wire pulled out of the coil is passed through the wound-wire notch in the outer partition wall and to an end of the inner partition wall before the wire is cut.

With the arrangement of the fifth feature, the wound wire pulled out of each coil is passed through the wound-wire notch of the outer partition wall and to the end of the inner partition wall before the wire is cut. Therefore, the wound wire before being cut can be extended radially inward to provide a tension for winding the wire, without being obstructed by the inner partition wall.

According to a sixth feature of the present invention, in addition to the fourth or fifth feature, when the adjacent insulators are brought into contact with each other, the ends of the inner partition walls are overlapped on each other.

With the arrangement of the sixth feature, when the adjacent insulators are brought into contact with each other and the ends of the inner partition walls are overlapped on each other. Therefore, it is possible to further reliably prevent the synthetic resin from leaking out of the annular space.

The above and other objects, features and advantages of the invention will become apparent from the following description of a preferred embodiment taken in conjunction with the accompanying drawings.

BRIEF DESCRIPTION OF THE DRAWINGS

FIG. 8 is a perspective view of a connecting terminal.

FIGS. 9A and 9B are views for explaining steps of processing an end of a wound wire.

DETAILED DESCRIPTION OF THE INVENTION

Figure 1:
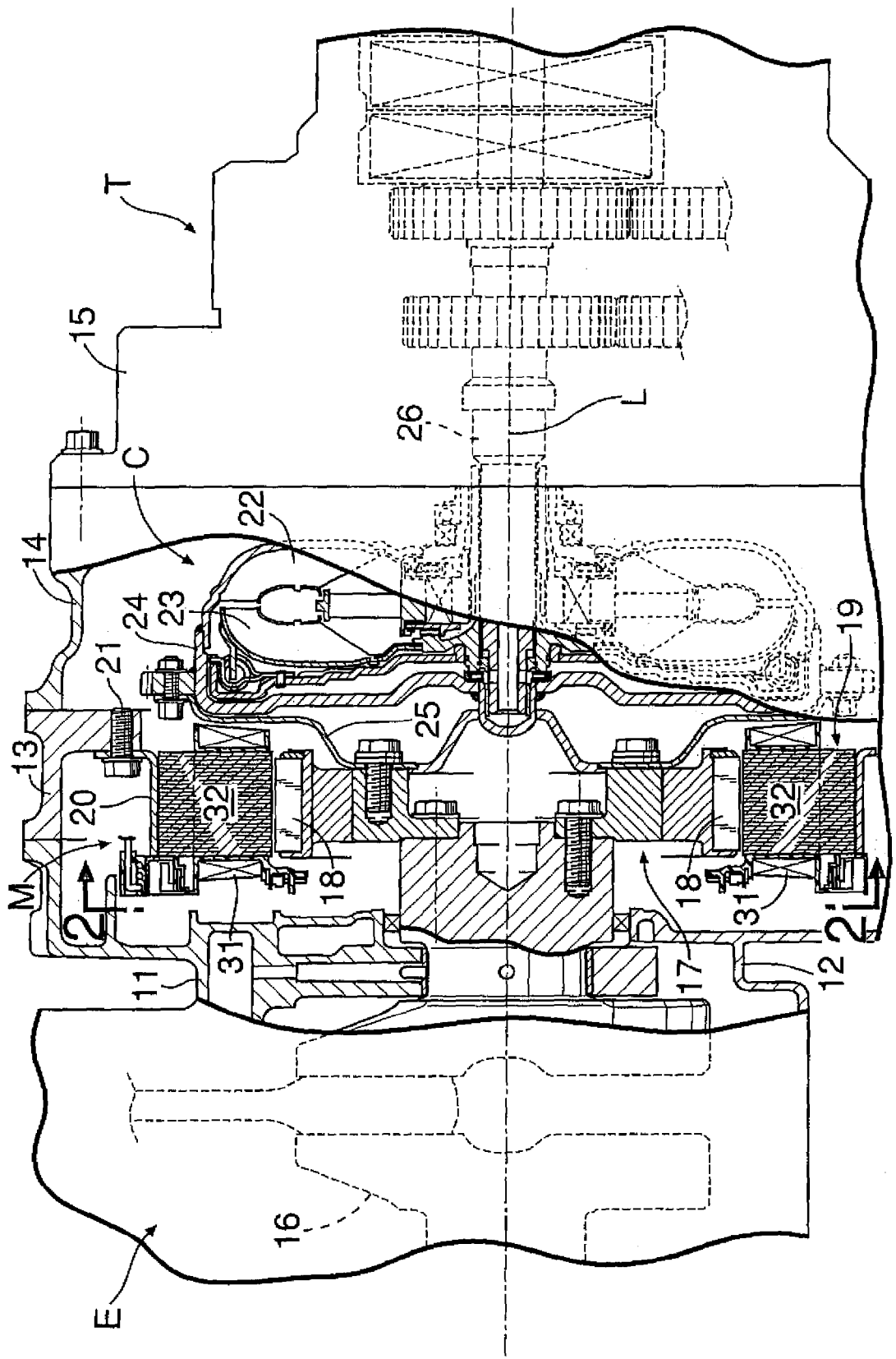
FIG. 1 is a vertically sectional view of a hybrid vehicle power unit including a motor stator structure according an embodiment of the present invention.

As shown in FIG. 1, a hybrid vehicle power unit includes a DC brushless motor M arranged between an engine E and a transmission T. A motor case 13, a torque converter case 14 and a transmission case 15 are coupled to right sides of a cylinder block 11 and a crankcase 12 of the engine E. A rotor 17 of the motor M is fixed to an end of a crankshaft 16 supported between the cylinder block 11 and the crankcase 12. An inner periphery of an annular stator 19 is opposed to a plurality of permanent magnets 18 fixed to an outer periphery of the rotor 17, with a predetermined air gap provided therebetween. An annular mounting bracket 20 fitted over an outer periphery of the stator 19 is fixed to the motor case 13 by a plurality of bolts 21.

A torque converter C is housed in the torque converter case 14. The torque converter C includes a turbine runner 22 and a pump impeller 23. A side cover 24 is coupled to the turbine runner 22 to cover the pump impeller 23, and connected to the rotor 17 of the motor M through a drive plate 25. The pump impeller 23 of the torque converter C is coupled to a left end of a main shaft 26 supported in the transmission case 15.

Figure 2:
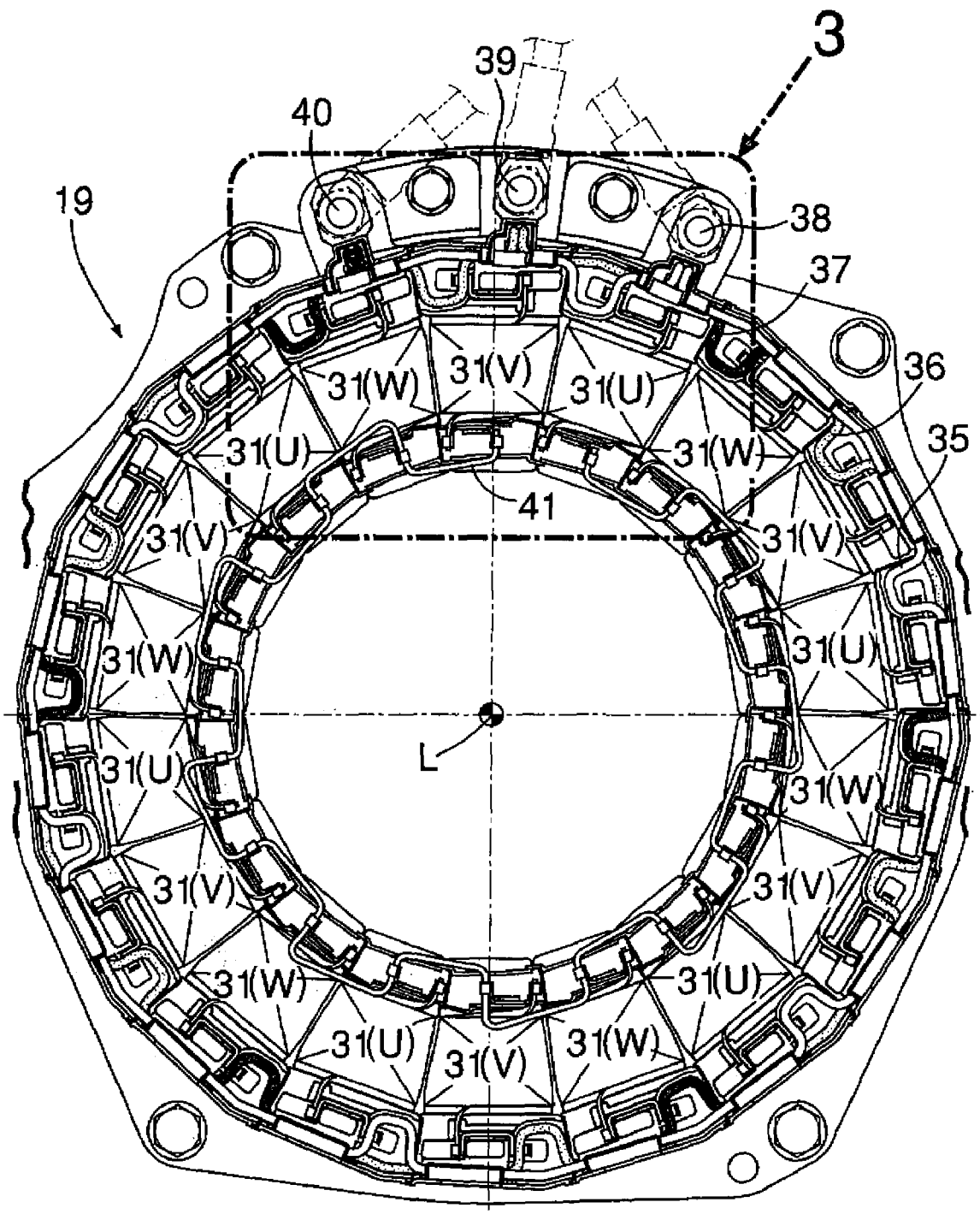
FIG. 2 is a view taken along a line 2-2 in FIG. 1.
Figure 3:
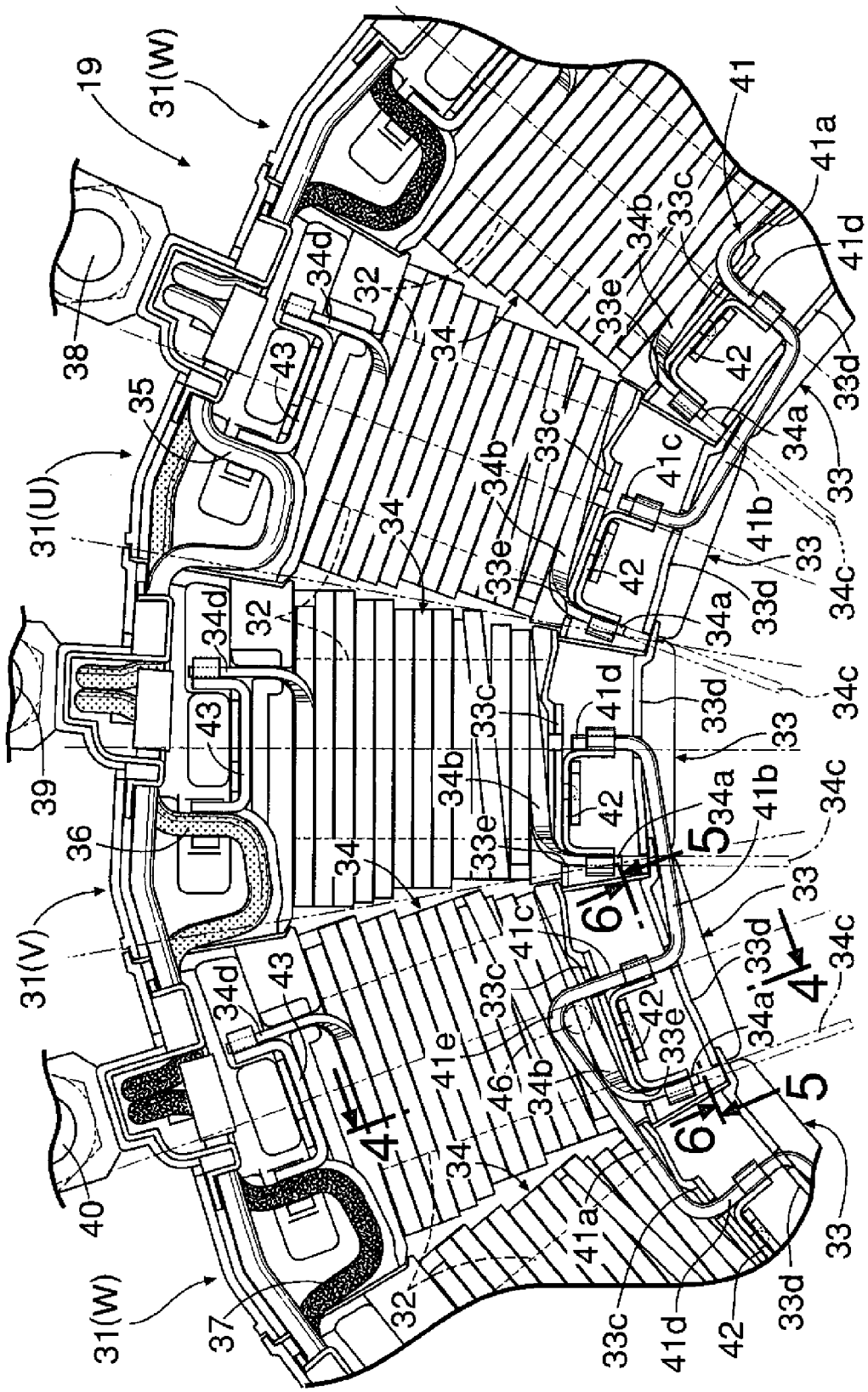
FIG. 3 is an enlarged view of a part 3 in FIG. 2.

As shown in FIGS. 2 and 3, the stator 19 of the motor M comprises a plurality of (eighteen in this embodiment) coils 31 which have the same structure and are coupled to one another in a circumferential direction. FIG. 3 completely shows three of the eighteen coils 31. Each coil 31 comprises: an iron core 32 made by laminating a large number of steel plates (see FIG. 1); a synthetic resin insulator (bobbin) 33 covering an outer periphery of the iron core 32; and a wound wire 34 wound around the insulator 33 so as to be plural wire layers. The wounded wire 34 comprises a rectangular cross-section wire having a rectangular cross-section so as to minimize a space formed between the adjacent turns of the wound wire 33 in a state in which the wire 34 is wound around the insulator 33, thereby increasing the lamination factor.

The eighteen coils 31 comprise six U-phase coils 31(U), six V-phase coils 31(V) and six W-phase coils 31(W) which are alternately arranged in a circumferential direction. A U-phase bus ring 35, a V-phase bus ring 36 and a W-phase bus ring 37 are provided around the outer periphery of the stator 19 in order to supply a U-phase current to the U-phase coils 31(U), a V-phase current to the V-phase coils 31(V) and a W-phase current to the W-phase coils 31(W), respectively. Each of the bus rings 35, 36 and 37 is formed of a metal wire bent into an annular shape. Their opposite ends are superposed on each other, and connected to corresponding one of U-phase, V-phase and W-phase feeder terminals 38, 39 and 40. In FIGS. 2 and 3, the U-phase, V-phase and W-phase bus rings 35, 36 and 37 are shown in three-gradation shadings, in order to distinguish the U-phase, V-phase and W-phase bus rings 35, 36 and 37 from one another.

The U-phase coil 31(U) is arranged every three coil-arrangements. One end of the wound wire 34 of the U-phase coil 31(U) is connected to the U-phase bus ring 35 through a connecting terminal 43. The V-phase coil 31(V) is arranged every three coil-arrangements. One end of the wound wire 34 of the V-phase coil 31(V) is connected to the V-phase bus ring 36 through the connecting terminal 43. The W-phase coil 31(W) is arranged every three coil-arrangements. One end of the wound wire 34 of the W-phase coil 31(W) is connected to the W-phase bus ring 37 through the connecting terminal 43.

Next, the connection of the other ends of the wound wires 34 of the eighteen coils 31 will be described with reference to FIGS. 3 to 8. The other ends of the wound wires 34 of the six U-phase coils 31(U), six V-phase coils 31(V) and six W-phase coils 31(W) are connected to a common neutral-point bus ring 41 in the same structure as described above.

Specifically, the insulator 33 includes a main portion 33a around which the wire 34 is wound, and an extended portion 33b extending radially inward from the main portion 33a. An outer partition wall 33c positioned radially outside the extended portion 33b, and an inner partition wall 33d positioned radially outside the extended portion 33b protrude axially from the extended portion 33b. When the adjacent two coils 31, 31 are coupled to each other, opposed ends of the two outer partition walls 33c, 33c are brought in contact with each other, and opposed ends of the two inner partition walls 33d, 33d are slightly overlapped on each other. Therefore, when the eighteen coils 31 are coupled to constitute the stator 19, an annular groove is formed between the eighteen outer partition walls 33c and the eighteen inner partition walls 33d.

Formed at positions closer to circumferentially one end in the outer partition wall 33c of the insulator 33, are a U-shaped wound-wire notch 33e through which a pulled-out portion 34b is passed in order to pull out the end 34a of the wound-wire 34, and a U-shaped bus-ring notch 33f through which the neutral-point bus ring 41 is passed. In the inner partition wall 33d of the insulator 33, a U-shaped bus-ring notch 33g through which the neutral-point bus ring 41 is passed is formed at a position opposed to a radially inner side of the bus-ring notch 33f in the outer partition wall 33c. A connecting-terminal fixing-wall 33h is projectingly provided on a radially inner side of the outer partition wall 33c. A U-shaped locking groove 33i is formed in the connecting-terminal fixing-wall 33h.

The connecting terminal 42 includes: a plate-shaped fixing portion 42a; a groove-shaped bus-ring connecting-portion 42b formed at one end of the fixing portion 42a; and a wound-wire connecting-portion 42c formed at the other end of the fixing portion 42a. A locking projection 42d is formed at a central portion of the fixing portion 42a. The fixing portion 42a of the connecting terminal 42 is inserted into a clearance between the outer partition wall 33c and the connecting-terminal fixing-wall 33h. At this time, the fixing portion 42a is positioned so as not drop out by engaging the locking projection 42d provided on the fixing portion 42a with the locking groove 33i provided in the connecting terminal-fixing wall 33h.

The neutral-point bus ring 41 is formed into a generally annular shape with its one portion opened. The neutral-point bus ring 41 comprises: a plurality of circumferentially extending larger-diameter portions 41a; a plurality of circumferentially extending smaller-diameter portions 41b; a plurality of first link portions 41c which connect opposed first-ends of the larger-diameter portions 41a and the smaller-diameter portions 41b in a radial direction; and a plurality of second link portions 41d which connect the opposed second-ends of the larger-diameter portions 41a and the smaller-diameter portions 41b in a radial direction.

A procedure of assembling the stator 19 having the above-described structure will be described below.

As shown in FIG. 9A, the wire 34 to be wound around the outer periphery of the insulator 33 is passed through the wound-wire notch 33e in the outer partition wall 33c to one end of the inner partition wall 33d of the insulator 33, and the wire 34 is wound from a radially inner portion of the insulator 33 in a state in which the wire 34 is fixed so as not to be loosened, by providing a tension indicated by an arrow A to a scrap wire portion 34c of the wire 34. Next, as shown in FIG. 9B, the wound wire 34 is cut at its winding-start wire-end 34a, that is, the wound wire 34 is cut at a position between the outer partition wall 33c and the inner partition wall 33d, and the scrap wire portion 34c which is unnecessary is removed. Likewise, an unnecessary portion leading from a wound-wire termination-end 34d of the wound wire 34 is cut.

After the eighteen coils 31 with the completed wire-windings are combined together into an annular shape as described above, as shown in FIG. 3, the winding-start wire-end 34a of the wound wire 34 is fitted into the connecting terminal 42 and connected by fusing to the wound-wire connecting-portion 42c of the connecting terminal 42 fixed to the insulator 33. The first and second link portions 41c and 41d of the neutral-point bus ring 41 are fitted into the connecting terminal 42 and connected by fusing to the bus-ring connecting-portions 42b of the connecting terminal 42.

Figure 10:
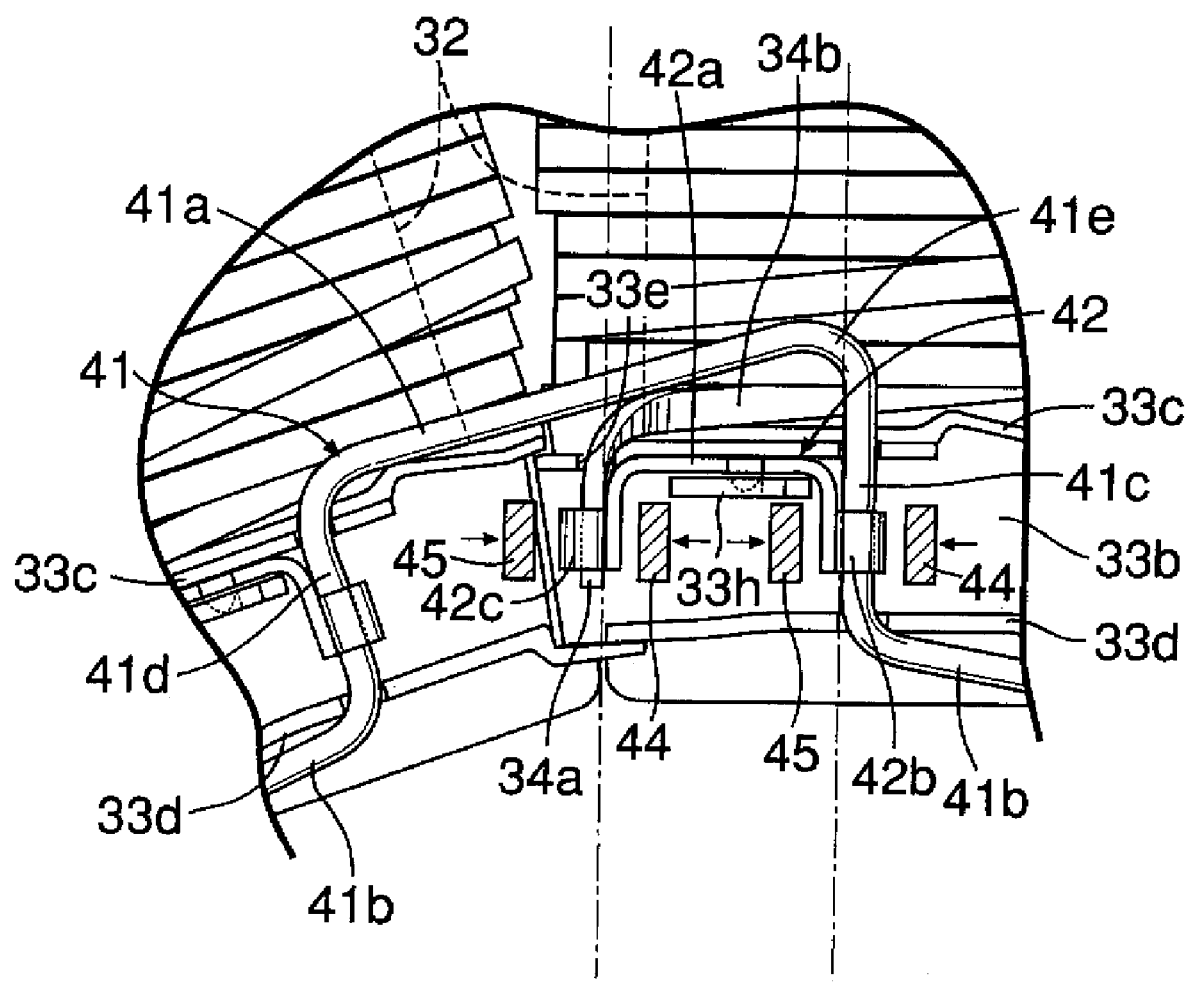
FIG. 10 is a view for explaining a fusing step.

At this time, the first and second link portions 41c and 41d of the neutral-point bus ring 41 are fitted into and positioned in the bus-ring notch 33f of the outer partition wall 33c and the bus-ring notch 33g of the inner partition wall 33d of the insulator 33, and the winding-start wire-end 34a of the wound wire 34 is fitted into and positioned in the wound-wire notch 33e of the outer partition wall 33c. However, because the first and second link portions 41c and 41d of the neutral-point bus ring 41 and the end 34a of the wound wire 34 extend in a direction perpendicular to the outer partition wall 33c and the inner partition wall 33d of the insulator 33, when the bus-ring connecting-portion 42b or the wound-wire connecting-portion 42c and welded by a pair of openable/closable fusing electrodes 44 and 45, the fusing electrodes 44 and 45 are prevented from interfering with the outer partition wall 33c and the inner partition wall 33d, as shown in FIG. 10.

In the conventional structure using no neutral-point bus ring 41, when the winding-start wire-end 34a of the wound wire 34 of each coil 31 is connected at a neutral point, an end of the wound wire 34 is required to be bent twice, that is, bent radially inward from a pulled-out portion 34b and further bent into a U-shape. However, in the present embodiment, the winding-start wire-end 34a is only required to be bent once radially inward from the pulled-out portion 34b. Therefore, even if a rectangular cross-section wire which is difficult to bend is used as the wound wire 34, the number of processing steps can be reduced to contribute to cost reduction.

On the winding-termination side of the wound wire 34, one end of the connecting terminal 43 is connected by fusing it to the winding-termination end 34d of the wound wire 34, and the other end of the connecting terminal 43 is connected by fusing it to any of the U-phase bus ring 35, the V-phase bus ring 36 and the W-phase bus ring 37.

Figure 4:
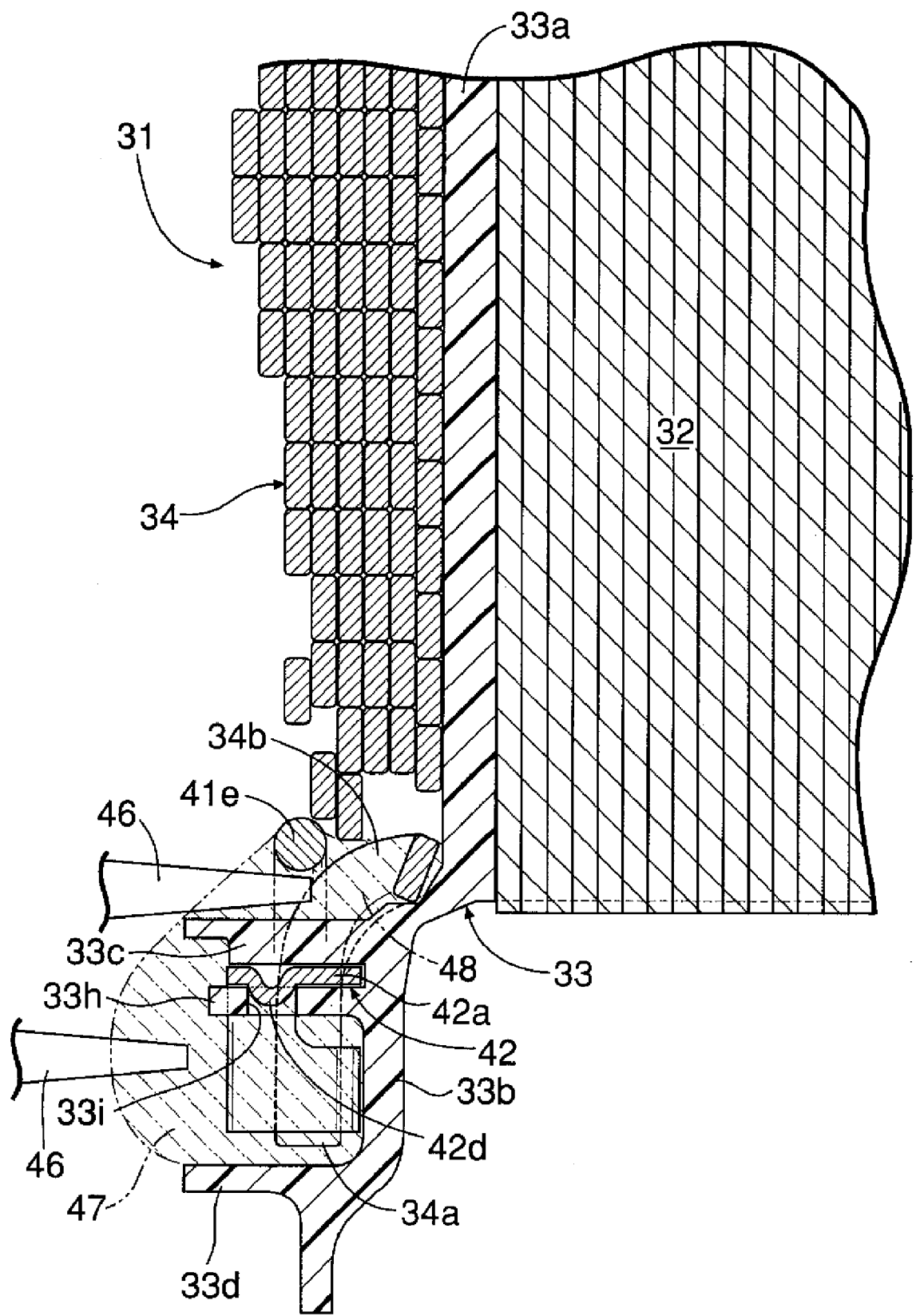
FIG. 4 is an enlarged sectional view taken along a line 4-4 in FIG. 3.
Figure 5:
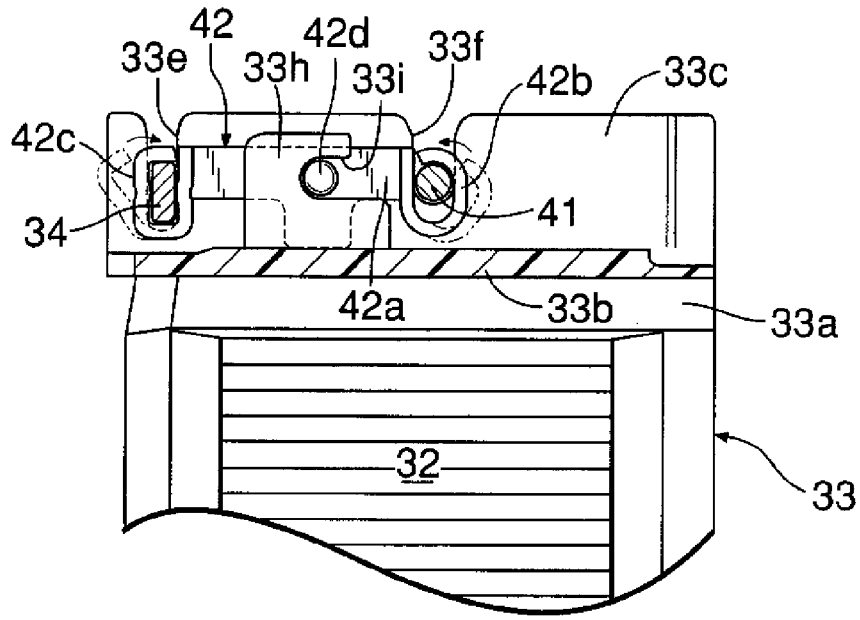
FIG. 5 is an enlarged sectional view taken along a line 5-5 in FIG. 3.
Figure 6:
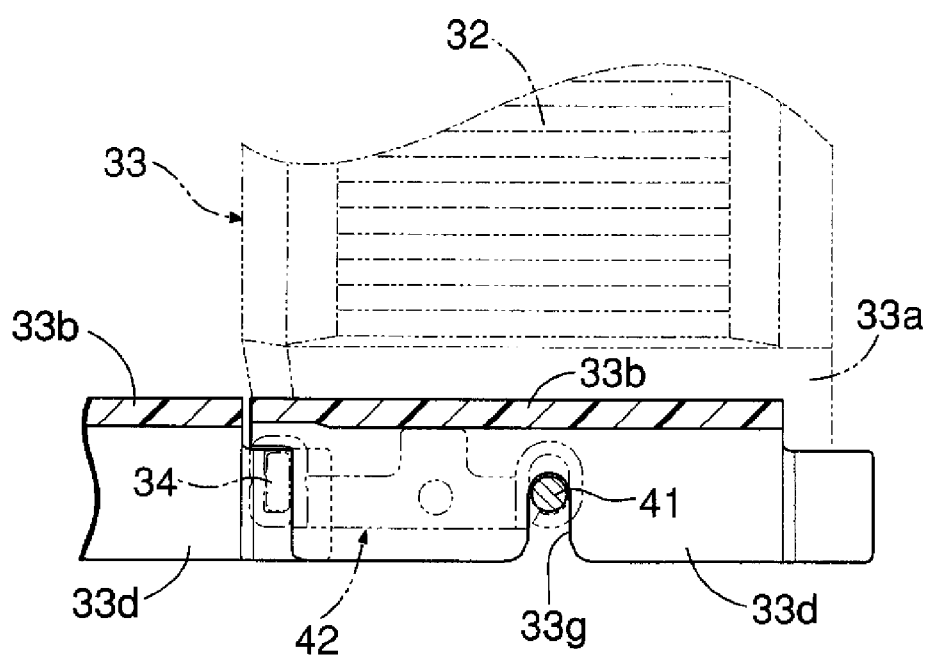
FIG. 6 is an enlarged sectional view taken along a line 6-6 in FIG. 3.
Figure 7:
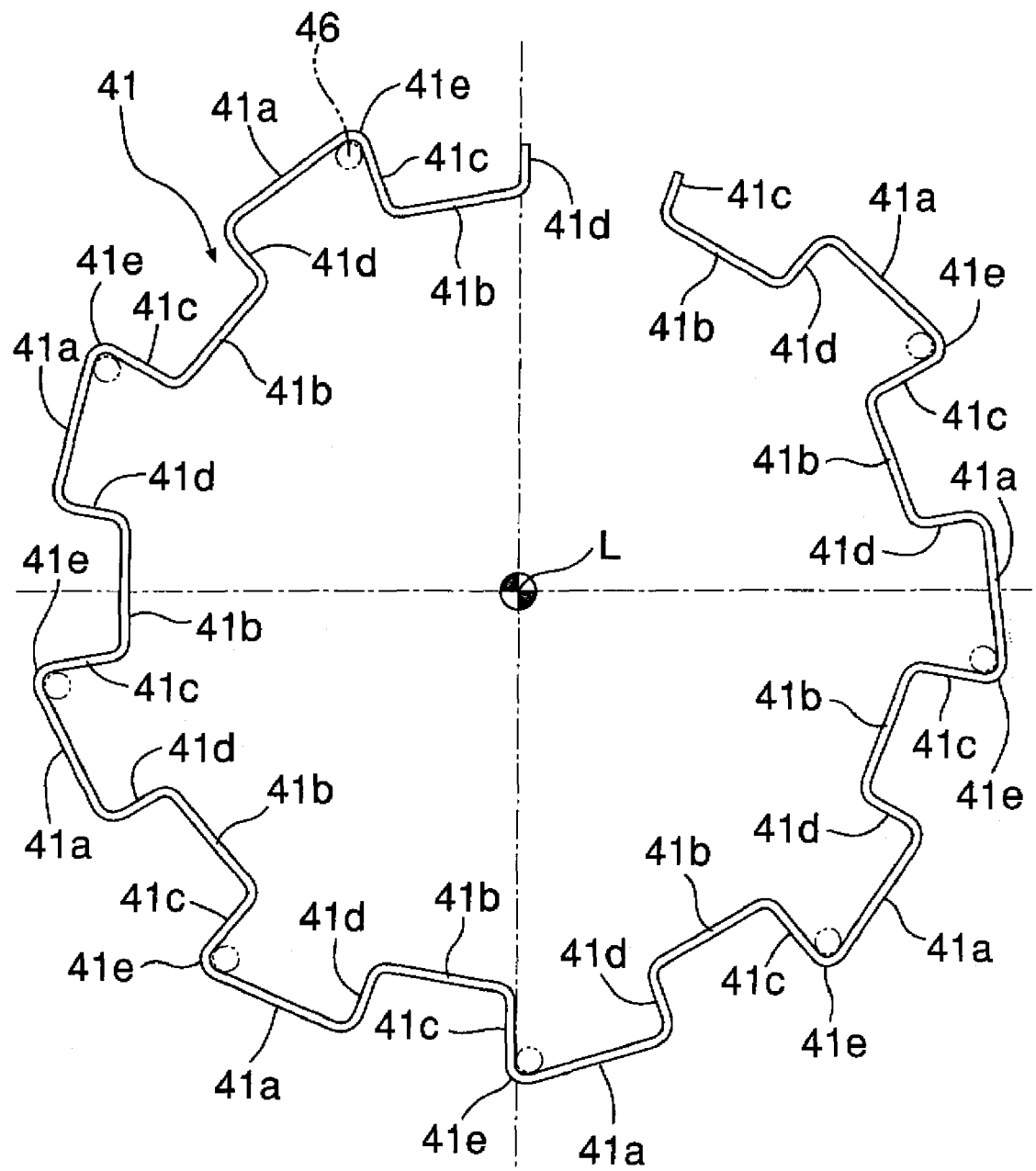
FIG. 7 is a front view of a neutral-point bus ring.

Next, a potting treatment is performed in order to enhance the mechanical durability against breaking of the wound wire and the chemical durability against corrosion of the wound wire by consolidating the wire-connecting portions with a synthetic resin. Specifically, as shown in FIG. 4, a potting nozzle 46 is inserted into a space between the outer partition wall 33c and the inner partition wall 33d of the insulator 33, and an unhardened synthetic resin is injected into the space. When the synthetic resin injected into the annular space between the outer partition wall 33c and the inner partition wall 33d is hardened, the connecting terminal 42 is embedded in the space to complete a potting 47.

At this time, the ends of the outer partition walls 33c of the adjacent insulators 33, 33 are in contact with each other, and the ends of the inner partition walls 33d of the adjacent insulators 33, 33 are in contact with each other, thus preventing the synthetic resin from leaking of out of the connected portions of the adjacent insulators 33, 33. Particularly because the ends of the inner partition walls 33d are overlapping each other, the leakage of the synthetic resin out of such portions is further reliably prevented. The wound-wire notch 33e and the bus-ring notch 33f are formed in the outer partition wall 33c, and the bus-ring notch 33g is formed in the inner partition wall 33d, but the end 34a of the wound wire 34 or the first and second link portions 41c and 41d of the neutral-point bus ring 41 are fitted into the notches 33e to 33g. Accordingly, the leakage of the synthetic resin out of these notches is minimized.

In this embodiment, as shown in FIG. 9A, the wire 34 is first passed through the one end of the inner partition wall 33d and the outer partition wall 33c, and then winding of the wire 34 is started. Suppose that a wire-passing notch were also formed in the inner partition wall 33d and the wire 34 were also passed through this notch, there is a problem: if the scrap wire portion 34c were cut after completion of the winding of the wire 34, the wound-wire notch 33e of the outer partition wall 33c would be plugged by the end 34a of the wound wire 34, but because the scrap wire portion 34c would be cut, the wire-passing notch of the inner partition wall 33d would remain opened without being plugged; and when the potting 47 would be provided, a large amount of the synthetic resin would leak out of the opened wire-passing notch.

However, in this embodiment, there is no problem of the leakage of synthetic resin, because such a wire-passing notch is not formed in the inner partition wall 33d and the scrap wire portion 34c of the wound wire 34 is pulled out through the end of the inner partition wall 33d.

Besides the region between the outer partition wall 33c and the inner partition wall 33d, the pulled-out portion 34b of the wound wire 34 in a region radially outwardly of the outer partition wall 33c is also fixed by the potting 47 (see FIG. 4), so that its position is not moved. At this time, if the larger-diameter portion 41a of the neutral-point bus ring 41 is positioned so as to cover the pulled-out portion 34b, it is impossible to insert the potting nozzle 46. However, because the bent portions 41e between the larger-diameter portion 41a and the first link portion 41c are extended radially outward to secure the space for insertion of the potting nozzle 46, the potting 47 can be reliably provided on the pulled-out portion 34b of the wound wire 34.

The potting is also provided on portions where the winding-termination ends 34d of the wound wires 34 are connected, through the connecting terminals 43, to the U-phase bus ring 35, the V-phase bus ring 36 and the W-phase bus ring 37.

Although the embodiment of the present invention has been described in detail, various modifications in design may be made without departing from the subject matter of the present invention.

For example, a rectangular cross-sectioned wire is employed as the wound wire 34 in the embodiment, but a circular cross-sectioned wire may also be employed.

Additionally, a portion of the neutral-point bus ring 41 is opened in this embodiment, but the neutral-point bus ring 41 may also be formed into a completely closed annular shape.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A motor stator structure, comprising:
   a stator including a plurality of coils, each coil including a wire wound around a periphery of an iron core, said coils being annularly arranged about an axis of the stator, first ends of the wires of the coils being connected to each other by connecting terminals;
   a neutral-point bus ring formed of a bent wire material, having a generally annular shape and being arranged along an inner peripheral portion of the stator, said neutral-point bus including:
   (a) a plurality of larger-diameter portions and a plurality of smaller-diameter portions which alternately extend circumferentially, said smaller-diameter portions being disposed radially interior to said large-diameter portions, and
   (b) a plurality of link portions which extend radially, connecting the larger-diameter portions and the smaller-diameter portions to each other,
   wherein each of the first ends of the wound wire is positioned between adjacent two link portions which extend radially, and
   wherein a first end of each of said connecting terminals is connected to the first end of the wound wire, and a second end of each of said connecting terminals is connected to one of said link portions.

2. The motor stator structure according to claim 1, wherein a bent portion connecting one of the adjacent two link portions of the neutral-point bus ring to the larger-diameter portion of the neutral-point bus ring is located radially outward of a pulled-out portion of the wound wire of the coil, so as to provide a space radially inward of the bent portion into which a nozzle for potting the pulled-out portion can be inserted.

3. The motor stator structure according to claim 1, wherein the wound wire of the coil is formed of a rectangular cross-sectioned wire, and the neutral-point bus ring is formed of a circular cross-sectioned wire.

4. The motor stator structure according to claim 2, wherein the wound wire of the coil is formed of a rectangular cross-sectioned wire, and the neutral-point bus ring is formed of a circular cross-sectioned wire.

* * * * *